US009812275B2

(12) United States Patent
Hrnicko et al.

(10) Patent No.: US 9,812,275 B2
(45) Date of Patent: *Nov. 7, 2017

(54) RF THERMAL FUSE

(71) Applicant: CommScope Technologies LLC, Hickory, NC (US)

(72) Inventors: Frantisek Hrnicko, Pardubice (CZ); Vaclav Volf, Pardubice (CZ); Libor Strachon, Holice (CZ); Thomas Kummetz, Kissing (DE); Stefan Eisenwinter, Buchdorf (DE); Matthew Thomas Melester, McKinney, TX (US); Jurgen Struller, Bergen (DE); Gabriel Toth, Pardubice (CZ)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,991

(22) Filed: Aug. 26, 2016

(65) Prior Publication Data

US 2016/0372283 A1   Dec. 22, 2016

Related U.S. Application Data

(63) Continuation of application No. 13/869,653, filed on Apr. 24, 2013, now Pat. No. 9,443,683.
(Continued)

(51) Int. Cl.
*H01H 37/52* (2006.01)
*H01H 37/36* (2006.01)
(Continued)

(52) U.S. Cl.
CPC ............ *H01H 37/52* (2013.01); *H01H 37/36* (2013.01); *H01H 37/46* (2013.01);
(Continued)

(58) Field of Classification Search
CPC ........ H01H 37/36; H01H 37/46; H01H 37/52; H01H 37/74; H01H 37/76; H01H 37/761;
(Continued)

(56) References Cited

U.S. PATENT DOCUMENTS

| 1,685,136 | A | * | 9/1928 | Montgomery | ....... H01H 37/767 337/409 |
| 2,886,744 | A | | 5/1959 | McNatt, Jr. | |

(Continued)

FOREIGN PATENT DOCUMENTS

| CN | 101647080 | 2/2010 |
| DE | 29605370 | 7/1996 |

(Continued)

OTHER PUBLICATIONS

China Patent Office, "First Office Action for CN Application No. 201310465703.7", "from Foreign Counterpart to U.S. Appl. No. 13/869,653", dated Oct. 19, 2016, pp. 1-20, Published in: CN.
(Continued)

*Primary Examiner* — Anatoly Vortman
*Assistant Examiner* — Jacob Crum
(74) *Attorney, Agent, or Firm* — Fogg & Powers LLC

(57) ABSTRACT

Certain aspects are directed to a thermal fuse for preventing overheating of RF devices in a telecommunication system. In one embodiment, an RF thermal fuse comprises a body: a conductive bolt positioned in the body, the conductive bolt having a length sufficient to provide an impedance at a point of protection on a transmission line in response to the conductive bolt contacting a live conductor of the transmission line, wherein the impedance reflects a portion of the incident power of an RF signal from an RF signal source; and a driving mechanism that causes the conductive bolt to selectively contact the live conductor in response to an event.

25 Claims, 13 Drawing Sheets

Related U.S. Application Data

(60) Provisional application No. 61/711,350, filed on Oct. 9, 2012, provisional application No. 61/637,632, filed on Apr. 24, 2012.

(51) Int. Cl.
*H01H 37/46* (2006.01)
*H01H 79/00* (2006.01)
*H04W 52/04* (2009.01)
*H01H 37/76* (2006.01)
*H04W 88/08* (2009.01)

(52) U.S. Cl.
CPC ........ *H01H 37/761* (2013.01); *H01H 37/767* (2013.01); *H01H 79/00* (2013.01); *H04W 52/04* (2013.01); *H01H 2037/762* (2013.01); *H04W 88/08* (2013.01)

(58) Field of Classification Search
CPC ........... H01H 37/767; H01H 2037/762; H01H 79/00; H01P 1/28; H01P 1/30; H04W 52/04; H04W 88/08
USPC ........................................................ 337/333
See application file for complete search history.

(56) References Cited

U.S. PATENT DOCUMENTS

| | | | |
|---|---|---|---|
| 3,916,363 A | 10/1975 | Jekai | |
| 4,032,877 A * | 6/1977 | McAlister | H01H 37/761 337/148 |
| 4,164,724 A | 8/1979 | Bogdanski | |
| 4,199,736 A | 4/1980 | McTaggart et al. | |
| 4,237,513 A | 12/1980 | Foldes | |
| 4,568,898 A | 2/1986 | Spinner | |
| 4,721,481 A * | 1/1988 | Grellmann | H01R 24/52 439/551 |
| 5,115,217 A | 5/1992 | McGrath et al. | |
| 5,138,297 A | 8/1992 | Hollweck | |
| 6,014,297 A | 1/2000 | Clarey et al. | |
| 6,724,292 B2 | 4/2004 | Miyashita et al. | |
| 6,733,324 B1 | 5/2004 | Lecsek et al. | |
| 6,831,546 B2 | 12/2004 | Kaltenborn et al. | |
| 6,911,892 B2 | 6/2005 | Tanaka | |
| 7,071,808 B2 | 7/2006 | Nakamura | |
| 7,385,796 B2 | 6/2008 | Flanders | |
| 7,505,241 B2 | 3/2009 | McLoughlin et al. | |
| 7,843,307 B2 | 11/2010 | Yoshikawa | |
| 7,999,549 B2 | 8/2011 | Weiss | |
| 2006/0214762 A1 | 9/2006 | Rogers | |
| 2006/0255888 A1 | 11/2006 | Mayr | |
| 2009/0141416 A1 | 6/2009 | Dommaschk et al. | |
| 2009/0302990 A1 | 12/2009 | Neilly et al. | |
| 2010/0073120 A1 | 3/2010 | Knab et al. | |
| 2010/0231347 A1 * | 9/2010 | Knab | H01H 37/761 337/143 |
| 2010/0245022 A1 | 9/2010 | Galla et al. | |
| 2011/0104940 A1 | 5/2011 | Rabu et al. | |

FOREIGN PATENT DOCUMENTS

| | | |
|---|---|---|
| JP | 2007089054 | 4/2007 |
| WO | 2007095873 | 8/2007 |

OTHER PUBLICATIONS

State Intellectual Property Office of the People's Republic of China, "Notification of the Second Office Action for CN Application No. 201310465703.7", "Foriegn Counterpart to U.S. Appl. No. 13/869,653", dated May 31, 2017, pp. 1-6, Published in: CN.

European Patent Office, "European Search Report from EP Application No. 13187898.5", "from Foreign counterpart to U.S. Appl. No. 13/869,653", dated Jan. 27, 2014, pp. 1-4, Published in: EP.

European Patent Office, "Extended European Search Report for EP Application No. 15166240.0", "from Foreign Counterpart to U.S. Appl. No. 13/869,653", dated Sep. 10, 2015, pp. 1-8, Published in: EP.

U.S., "Notice of Allowance", "from U.S. Appl. No. 13/869,653", dated May 20, 2016, pp. 1-14, Published in: US.

U.S., "Ex Parte Quayle Action", "from U.S. Appl. No. 13/869,653", dated Dec. 4, 2015, pp. 1-14, Published in: US.

"Chemical Bath Immersion Heaters: Applicatin Guide for Thermal Over-Temperature Devices", Jan. 1, 2008, pp. 1-3, Publisher: TEMPCO Electric Heater Corporation, Published in: Wood Dale, Illinois.

* cited by examiner

RF THERMAL FUSE

CROSS-REFERENCE TO RELATED APPLICATIONS

This application is a Continuation application of, and claims the benefit and priority to, U.S. patent application Ser. No. 13/869,653 filed Apr. 24, 2013 and titled "RF Thermal Fuse", which claims priority to and the benefit of U.S. Provisional Application Ser. No. 61/637,632 filed Apr. 24, 2012 and titled "RF Termination Device with Thermal Over-Temperature Protection Fuse" and U.S. Provisional Application Ser. No. 61/711,350 filed Oct. 9, 2012 and titled "RF Thermal Fuse," which are each hereby incorporated by reference in their entirety.

TECHNICAL FIELD

The present invention relates generally to telecommunications systems and more particularly (although not necessarily exclusively) to thermal fuses for preventing overheating of RF devices in a telecommunication system.

BACKGROUND

The power of a signal received by a telecommunications device in a telecommunications system can cause the temperature of the telecommunications device to increase. A telecommunications device can include a cooling mechanism that can maintain the temperature of internal components of the telecommunications device such that the internal components are not damaged by heat. An example of a cooling mechanism can include a forced airflow provided by a cooling fan.

A cooling mechanism such as a cooling fan can be powered by a power source in the telecommunications device. Deficiencies in the power source can cause power to cease being provided to the cooling mechanism. Deficiencies in the power source can include (but are not limited to) a defective power supply, a switching off of the power source, an over-current fuse trip, etc. The loss of power to the cooling mechanism can cause the RF termination device or other components of the telecommunications device to increase in temperature such that the components will be overstrained, defective, and/or dangerous to touch.

SUMMARY

Certain aspects and features of the present invention are directed to thermal fuses for preventing overheating of RF devices in a telecommunication system.

In one aspect, an RF thermal fuse is provided. The RF thermal fuse includes a body, a conductive bolt, and a driving mechanism. The body can be positioned on a transmission line between an RF signal source and an RF device. The conductive bolt is positioned in the body. The conductive bolt has a length sufficient to provide impedance at a point of protection on the transmission line in response to the conductive bolt contacting a live conductor of the transmission line. The impedance is sufficient to reflect a portion of the incident power of an RF signal from the RF source. The driving mechanism can cause the conductive bolt to contact the live conductor in response to a temperature at or near the point of protection exceeding a threshold temperature.

In another aspect, a thermal protection system is provided. The thermal protection system includes multiple RF fuses. Each RF fuse includes a body, a conductive bolt, and a driving mechanism. The body can be positioned on a transmission line between an RF signal source and an RF device. The conductive bolt is positioned in the body. The conductive bolt has a length sufficient to provide impedance at a point of protection on the transmission line in response to the conductive bolt contacting a live conductor of the transmission line. The driving mechanism can cause the conductive bolt to contact the live conductor in response to a temperature at or near the point of protection exceeding a threshold temperature. The RF thermal fuses are positioned on the transmission line at intervals such that the RF thermal fuses provide a combined impedance that is sufficient to reflect a portion of the incident power of an RF signal in a predetermined frequency band from the RF signal source.

In another aspect, a system is provided. The system includes and RF device in communication with an RF signal source via a transmission line and an RF thermal fuse positioned on the transmission line. The RF thermal fuse includes a body, a conductive bolt, and a driving mechanism. The body can be positioned on the transmission line between the RF signal source and the RF device. The conductive bolt is positioned in the body. The conductive bolt has a length sufficient to provide impedance at a point of protection on the transmission line in response to the conductive bolt contacting a live conductor of the transmission line. The impedance is sufficient to reflect a portion of the incident power of an RF signal from the RF source. The driving mechanism can cause the conductive bolt to contact the live conductor in response to a temperature at or near the point of protection exceeding a threshold temperature.

DETAILED DESCRIPTION

Figure 1:
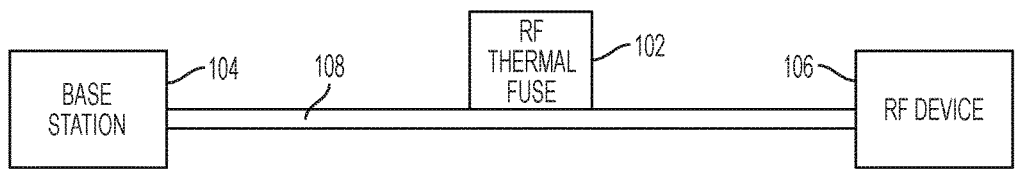
FIG. 1 is a block diagram of an example RF thermal fuse positioned along a transmission line between a base station and an RF device according to one aspect.

Certain aspects and examples are directed to RF thermal fuses for preventing overheating of an RF device receiving signals from a base station or other RF signal source.

In accordance with some aspects, an RF thermal fuse can include a body, a conductive bolt, and a driving mechanism. The body can be positioned on a transmission line, such as a coaxial cable, between an RF signal source, such as a base station, and an RF device, such as an antenna unit. The bolt can be formed from or otherwise include a conductive material. The bolt can be positioned in the body. The bolt can have a length sufficient to provide an impedance at the point of protection in response to the bolt contacting a "live" conductor of the transmission line that carries RF signals, such as (but not limited to) the inner conductor of a coaxial cable. The impedance can be sufficient to reflect at least a portion of the incident power of an RF signal from the RF signal source. The incident power or portion thereof that is reflected back to the RF signal source can be sufficient to cause the RF signal source to cease providing RF signals to an RF device protected using the RF thermal fuse. The driving mechanism can cause the bolt to contact the conductor in response to a temperature of the conductor exceeding a threshold temperature.

The RF thermal fuse can be positioned at a protection point of the transmission line via which RF signals are transmitted to the protected RF device. For example, the RF thermal fuse can be mounted on the outer conductor of a coaxial cable used as a transmission line. A base station or other RF signal source can transmit RF signals to the protected RF device via the transmission line. A non-limiting example of a protected RF device is a point-of-interface connecting a base station to a distributed antenna system or other telecommunication system. Other non-limiting examples of a protected device include devices that use active cooling, such as dummy loads, attenuators, or other devices. Active cooling systems may include cooling systems that require external power such as fans. Devices that use active cooling may be damaged if exposed to incident RF power via the transmission line without active cooling and/or other proper cooling methods. The RF thermal fuse can reflect most or all of the incident power from an RF signal back to an RF signal source (e.g., a base station) in response to the temperature at or near the protection point exceeding the critical temperature of the device.

In additional or alternative aspects, the RF thermal fuse can reflect most or all of the incident power from an RF signal back to the RF signal source in response to the protected RF device being set to an "OFF" status. For example, a power source that supplies DC power to the RF device can be turned off. An RF signal source may continue to transmit RF signals to the RF device after the power source is turned off. Continuing to transmit RF signals to the RF device after the power source is turned off can cause the RF device to overheat. The RF thermal fuse can reflect incident power from an RF signal back to the RF signal source in response to the power source being turned off, thereby notifying the RF signal source that it should cease transmitting RF signals to the RF device.

As used herein, the term "'OFF' status" is used to refer to a state for an RF device in which the RF device does not transmit or receive RF signals.

As used herein, the term "'ON' status" is used to refer to a state for an RF device in which the RF device transmits or receives RF signals.

The RF thermal fuse can provide high impedance at the protection point during standard operation of the protected RF device. As used herein, the term "standard operation" is used to refer to an operational state in which the RF device being in an "ON" status in which the RF device can receive and/or transmit RF signals. The RF thermal fuse can provide low impedance at the protection point in response to the temperature at or near the protection point exceeding the critical temperature such that most of incident power is reflected towards the RF signal source. The temperature at or near the protection point can be measured by a temperature sensor.

In some aspects, the RF thermal fuse can include a switching mechanism positioned at the end of a stub. The stub can be connected in parallel to the protected transmission line at the protection point. The stub can physically separate a switching point and a protection point. The stub can have a length of N×λ/4, where N is an integer and λ is the wavelength of an RF signal at an operating frequency. The operating frequency can be a frequency of an RF signal transmitted by a base station or other RF signal source via the transmission line. An even value of N can provide an open-circuited stub in standard operation. An odd value of N can provide a short-circuited stub such that performance in the transmission line is not affected during standard operation.

In additional aspects, the RF thermal fuse can be positioned such that the RF thermal fuse provides a short circuit within a close vicinity of the protection point (i.e., N=0). For example, an RF thermal fuse can provide a short circuit within a close vicinity of the protection point in response to the protected RF device being in an "OFF" status.

In some aspects, the RF thermal fuse can be irreversible. An irreversible RF thermal fuse can be replaced after the single overheating event. In other aspects, the RF thermal fuse can be reversible. For example, after each overheating event, the bolt of a reversible RF thermal fuse can re-set to a position that does not affect the transmission of RF signals along the protected transmission line.

As used herein, the term "irreversible" is used to refer to an RF thermal fuse being used to protect the RF device in response to a single overheating event, where the RF thermal fuse is replaced after the overheating event.

As used herein, the term "reversible" is used to refer to an RF thermal fuse being used to protect the RF device in response to multiple overheating events, where the RF thermal fuse is re-set after each overheating event.

In additional or alternative aspects, the RF device can include one or more thermal over-temperature protection fuses. The thermal over-temperature protection fuse can cause an RF signal path that includes the transmission line and the RF device to open. Opening the signal path can interrupt electrical current, such as the current caused by a signal communicated from a base station or other RF signal source to the RF device, from flowing through the signal path. Interrupting the electrical current can prevent the base station or other RF signal source from providing RF power to the RF device. Preventing the base station or other telecommunications device from providing RF power to the RF device can prevent components of the RF device from overheating.

Detailed descriptions of these aspects and examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

Figure 2:
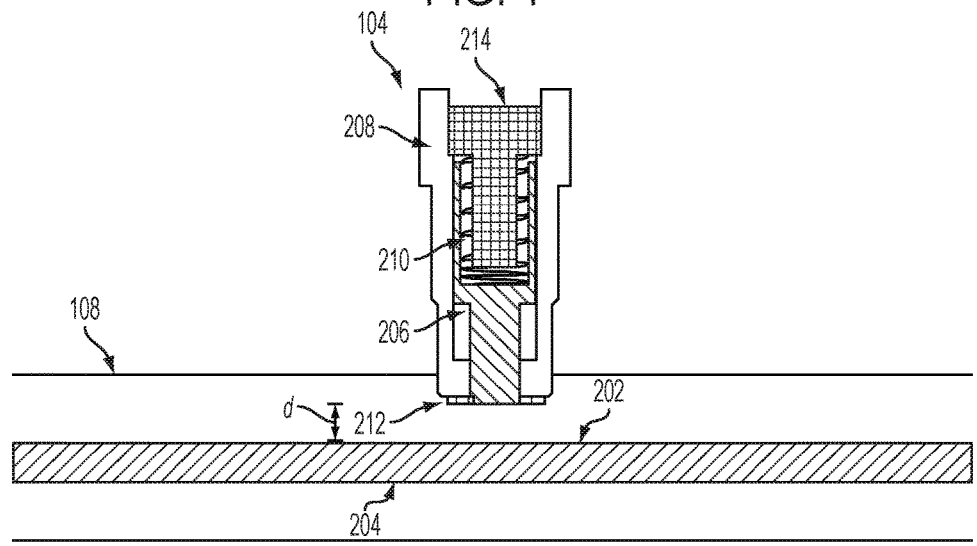
FIG. 2 is a cross-sectional side view of an irreversible RF thermal fuse positioned along a transmission line according to one aspect.
Figure 3:
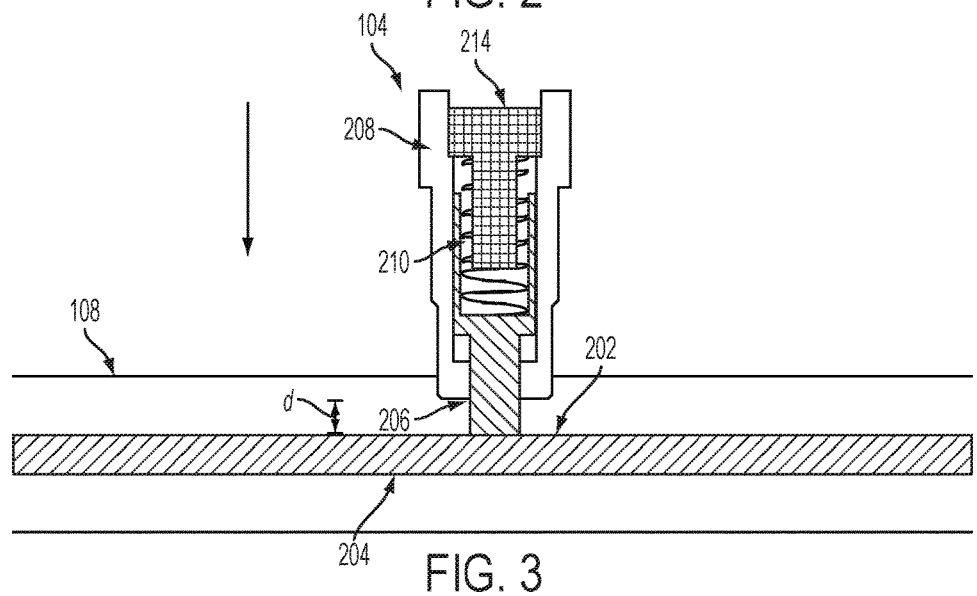
FIG. 3 is a cross-sectional side view of the irreversible RF thermal fuse creating a short circuit in a transmission line according to one aspect.

FIGS. 1-3 depict an example irreversible RF thermal fuse 102 that can be used to protect RF devices from over-heating in a telecommunication system.

FIG. 1 is a block diagram depicting an RF thermal fuse 102 positioned along a transmission line 108 between a base station 104 and an RF device 106. A transmission line 108 can include any suitable transmission medium for electrically communicating signals between an RF signal source, such as a base station 104, and a protected RF device 106. Non-limiting examples of a protected RF device 106 include a remote antenna unit, a point-of-interface device connecting a base station 104 to a distributed antenna system or other telecommunication system, and the like.

FIG. 2 is a cross-sectional side view of a RF thermal fuse 102 positioned along the transmission line 108 at a protection point 202. The RF thermal fuse 102 can include a bolt 206, a body 208, a spring 210, and an adjustment screw 214. The bolt 206, the spring 210, and the adjustment screw 214 can be disposed in the body 208. The bolt 206 can be formed from or otherwise include a conductive material, such as (but not limited to) copper. The body 208 can be formed from any suitable rigid non-conductive material, such as (but not limited to) plastic. The spring 210 can be an expansion spring adapted to exert a force against the bolt 206 in a direction of a conductor 204 of the transmission line 108.

A solder 212 can be applied to the bolt 206 to maintain the bolt 206 in a position that does not contact the conductor 204. The solder 212 can exert a force resisting the force exerted by the spring 210. The solder 212 can include a metal or other soldering material having a melting temperature that is less than or equal to a threshold temperature. The threshold temperature can be indicative of overheating in the transmission line 108. A non-limiting example of a melting temperature is 95-100 degrees Celsius.

The RF thermal fuse 102 can be positioned to such that the protected transmission line 108 is short-circuited at the protection point 202 in response to an overheating event. A temperature at or near the RF thermal fuse 102 that exceeds the threshold temperature can cause the soldering material of the solder 212 to melt. Melting the solder 212 can reduce or cease resistance of the force exerted by the spring 210. Reducing or ceasing resistance to the force exerted by the spring 210 can cause the bolt 206 to move toward the conductor 204 of the protected transmission line 108, as depicted by the downward arrow in FIG. 3.

The bolt 206 can make a connection with the conductor 204 of the transmission line 108. The connection with the transmission line 108 can be a galvanic connection allowing the flow of current through the bolt 206. The connection can provide a low impedance $Z_L$ in parallel to the protected transmission line 108 at the protection point 202. The value of the impedance $Z_L$ can be determined by the distance d of the short-circuit position from the protection point, as represented by the equation $$Z_L = j \times Z_0 \times \tan(\Theta)$$

where $Z_0$ is the characteristic impedance of the stub and $\Theta$ is an electrical length corresponding to the distance d between a physical position of the short circuit and the protection point 202.

An RF signal from a base station 104 or other signal source can encounter the impedance $Z_L$. Encountering the impedance $Z_L$ can cause a portion of incident power from the RF signal to be reflected back to the base station 104 or other signal source. The base station 104 or other RF signal source can receive the reflected RF signal. The base station 104 or other signal source can determine that the reflected incident power is sufficiently large that no additional RF signals are to be transmitted to the protected RF device 106. The base station 104 or other signal source ceasing to transmit RF signal can thereby protect the protected RF device 106 from additional warming.

The solution depicted in FIGS. 1-3 can be used, for example, in applications in which the distance d between a physical position of the short-circuit and the protection point 202 is sufficiently small compared to $\lambda/4$ at the operating frequency, such as for operating frequencies from DC to a few GHz. The protected RF device 106 can be returned to operation by replacing the melted RF thermal fuse 102 with a new RF thermal fuse.

Figure 4:
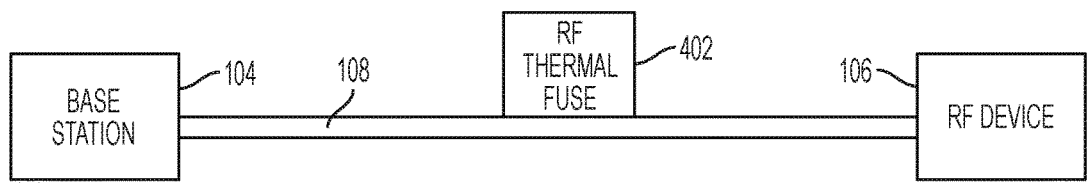
FIG. 4 is a block diagram of an alternative example RF thermal fuse positioned along a transmission line between a base station and an RF device according to one aspect.
Figure 5:
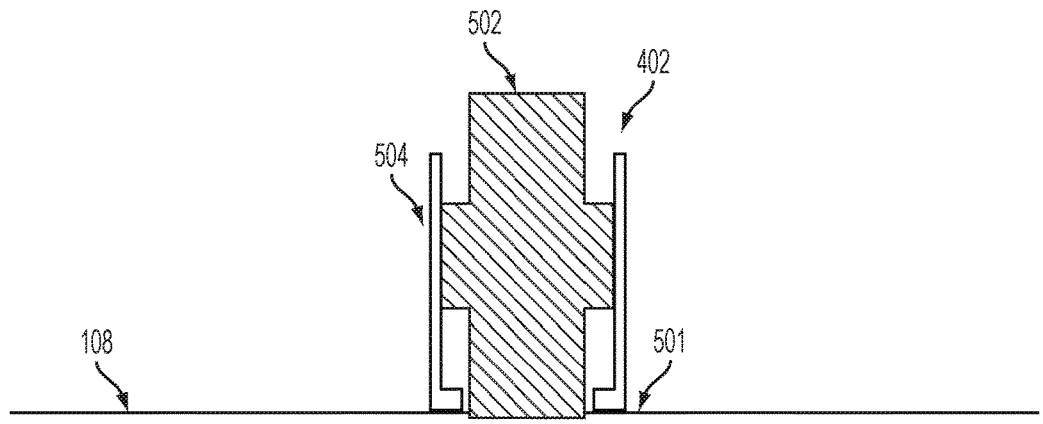
FIG. 5 is a cross-sectional side view of a reversible RF thermal fuse positioned along a transmission line according to one aspect.
Figure 6:
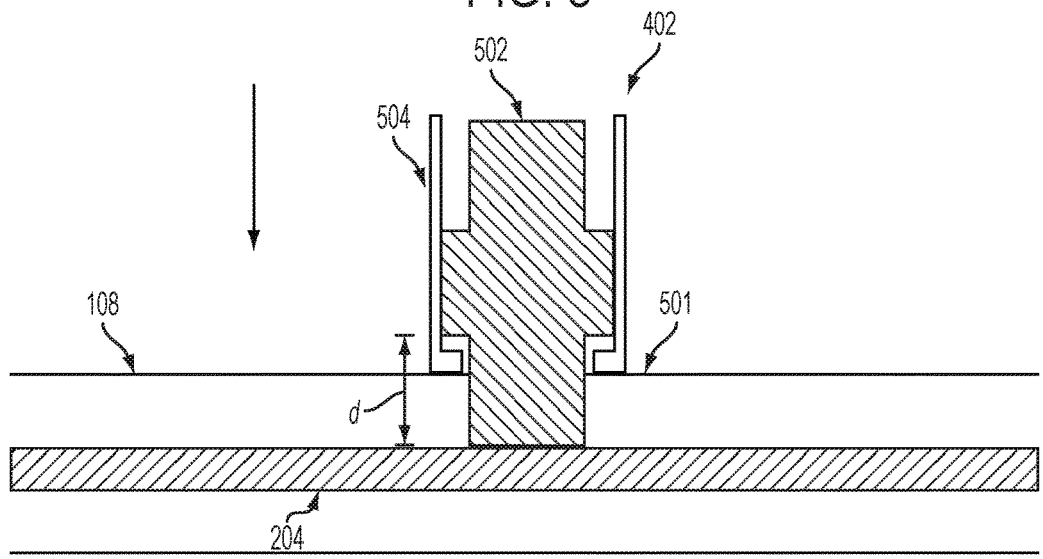
FIG. 6 is a cross-sectional side view of the reversible RF thermal fuse creating a short circuit in a transmission line according to one aspect.

In other aspects, the RF thermal fuse can be reversible, as depicted in FIGS. 4-6. FIG. 4 is a block diagram depicting an RF thermal fuse 402 positioned along a transmission line 108 between a base station 104 and an RF device 106. FIG. 5 is a cross-sectional side view of a RF thermal fuse 402 positioned along the transmission line 108 at a protection point 501. The RF thermal fuse 402 includes a bolt 502 and a body 504. The bolt 502 can be disposed in the body 504. The bolt 502 can be formed from or otherwise include a conductive material. For the protected RF device 106 being in an "ON" status, the bolt 502 being positioned in the body 504 can prevent the bolt 502 from influencing transmission of RF signals from a base station 104 or other RF signal source to the protected RF device 106, as depicted in FIG. 5. For the protected RF device being in an "OFF" status, the bolt 502 can move toward the conductor 204, as depicted by the downward arrow in FIG. 6. The bolt 502 contact the conductor 204 to generate a short circuit, thereby providing a low-impedance connection to the protection point 501.

The RF thermal fuse 402 for N=0 can be used at low RF frequencies wherein the distance d between the physical position of a short-circuit provided by the RF thermal fuse 402 and the point of protection (as depicted in FIG. 6) is smaller than $\lambda/4$ at the operating frequency.

Figure 7:
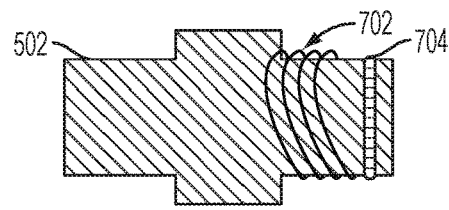
FIG. 7 is a side view of a reversible RF thermal fuse with a steering ring according to one aspect.
Figure 8:
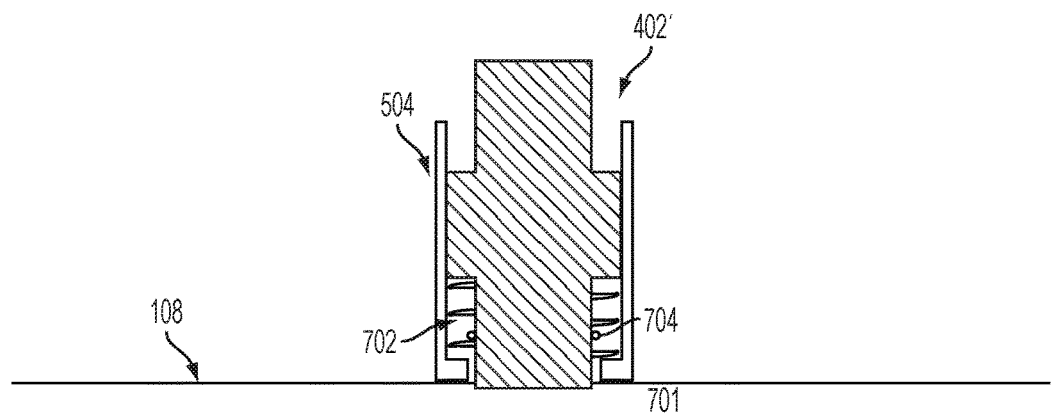
FIG. 8 is a cross-sectional side view of a reversible RF thermal fuse with a steering ring positioned along a transmission line according to one aspect.
Figure 9:
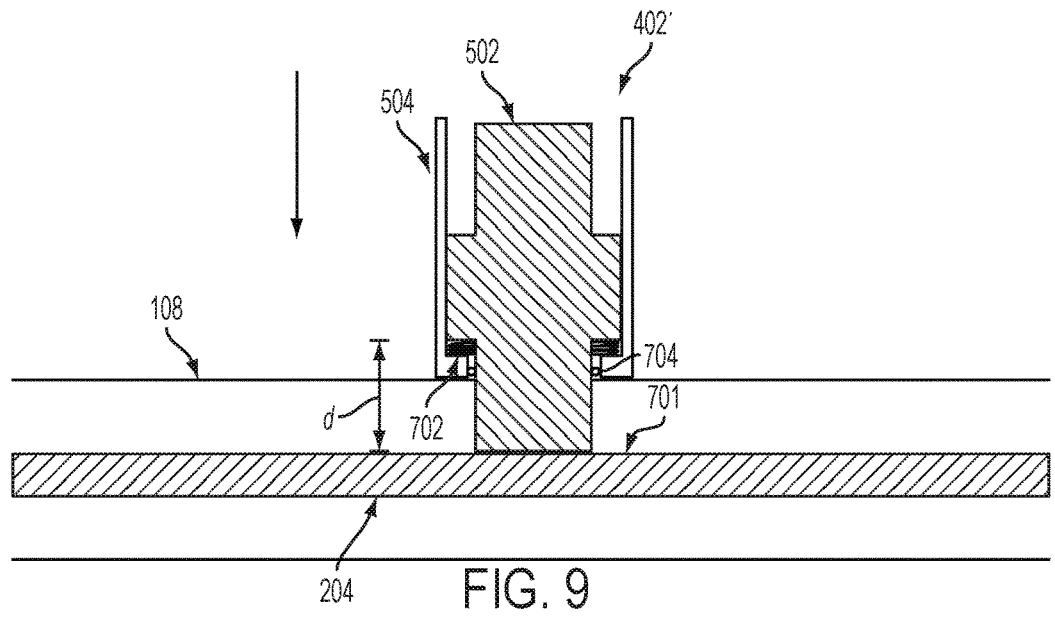
FIG. 9 is a cross-sectional side view of a reversible RF thermal fuse with a steering ring creating a short circuit in a transmission line according to one aspect.

In additional or alternative aspects, an RF thermal fuse 402 can be modified to increase the operating frequency band, as depicted in FIGS. 7-9. The operating frequency band can be increased by using an RF thermal fuse having a spring 702 and a metallic steering ring 704, as depicted by the lateral side view of the bolt 502 in FIG. 7. The spring 702 and a metallic steering ring 704 can be disposed in the body 504, as depicted by the cross-sectional side view of the RF thermal fuse 402' FIG. 8. The spring 702 can exert a force causing the bolt 502 to contact the conductor 204 and create a short circuit, as depicted by the downward arrow in FIG. 9. The metallic steering ring 704 can shorten the distance d of the short circuit such that the distance d is the distance from the protection point 701 to the metallic steering ring 704. Shortening the distance d can allow the RF thermal fuse 402' to reflect incident power from higher frequency signals.

The position of the bolt 502 can be driven by any suitable driving mechanism. In some aspects, a reversible RF thermal fuse 402 can include a temperature-sensitive driving mechanism to position the bolt 502. Non-limiting examples of a suitable driving mechanism include bimetal, a shape memory alloy ("SMA") spring, air pressure, wax, liquid, relay, etc. with an appropriate spring/anchor mechanism.

Figure 10:
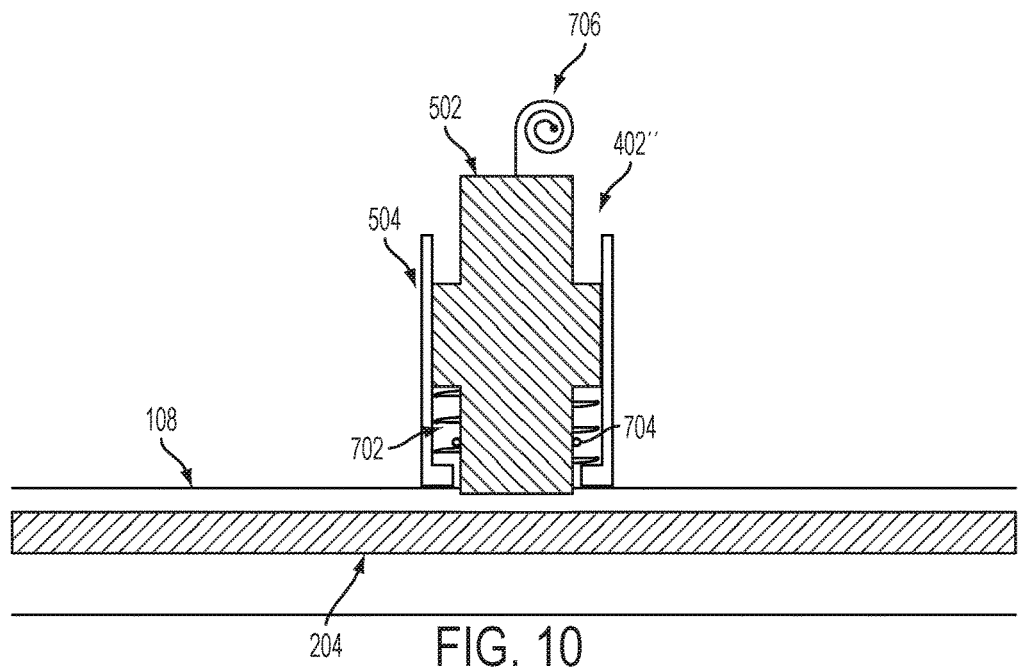
FIG. 10 is a cross-sectional side view of a reversible RF thermal fuse actuated by a bimetal driving mechanism positioned along a transmission line according to one aspect.
Figure 11:
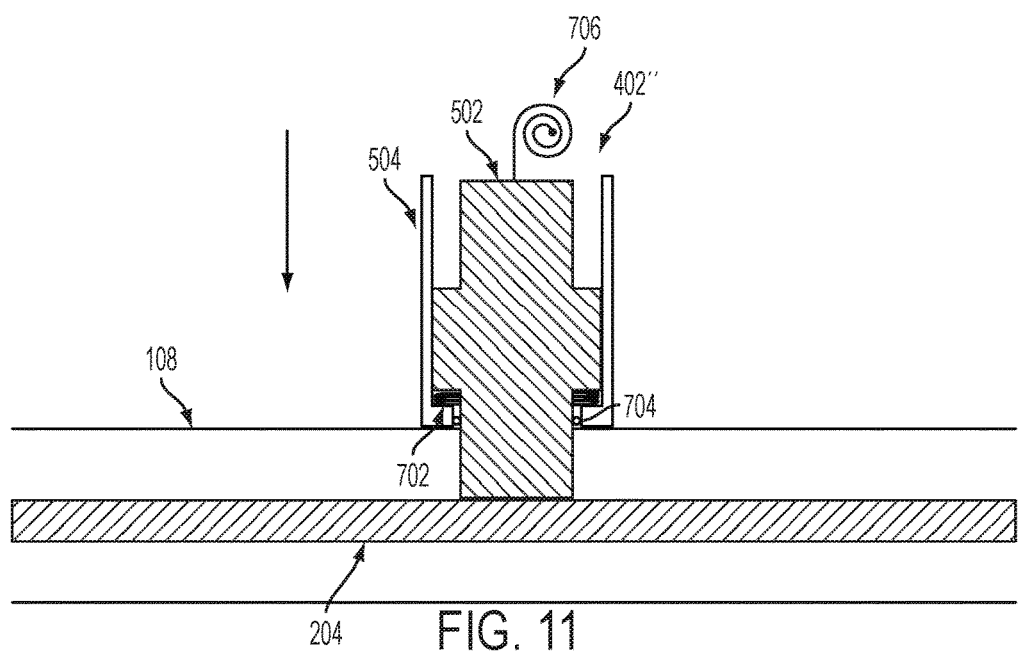
FIG. 11 is a cross-sectional side view of a reversible RF thermal fuse actuated by a bimetal driving mechanism creating a short circuit in a transmission line according to one aspect.

For example, FIGS. 10-11 depict an RF thermal fuse 402" having a bimetal driving mechanism 706. In standard operation, as depicted in FIG. 10, the bimetal driving mechanism 706 can exert a force that resists a force exerted by the spring 702. A temperature exceeding a threshold temperature can allow the bimetal driving mechanism 706 to lengthen, as depicted in FIG. 11. Lengthening the bimetal driving mechanism 706 can reduce or remove the force resisting the force exerted by the spring 702. Reducing or removing the force resisting the force exerted by the spring 702 can allow the spring 702 to contract. Contracting the spring 702 can cause the bolt 502 to move toward the conductor 204 of the transmission line 108, as depicted by the downward arrow in FIG. 11.

Figure 12:
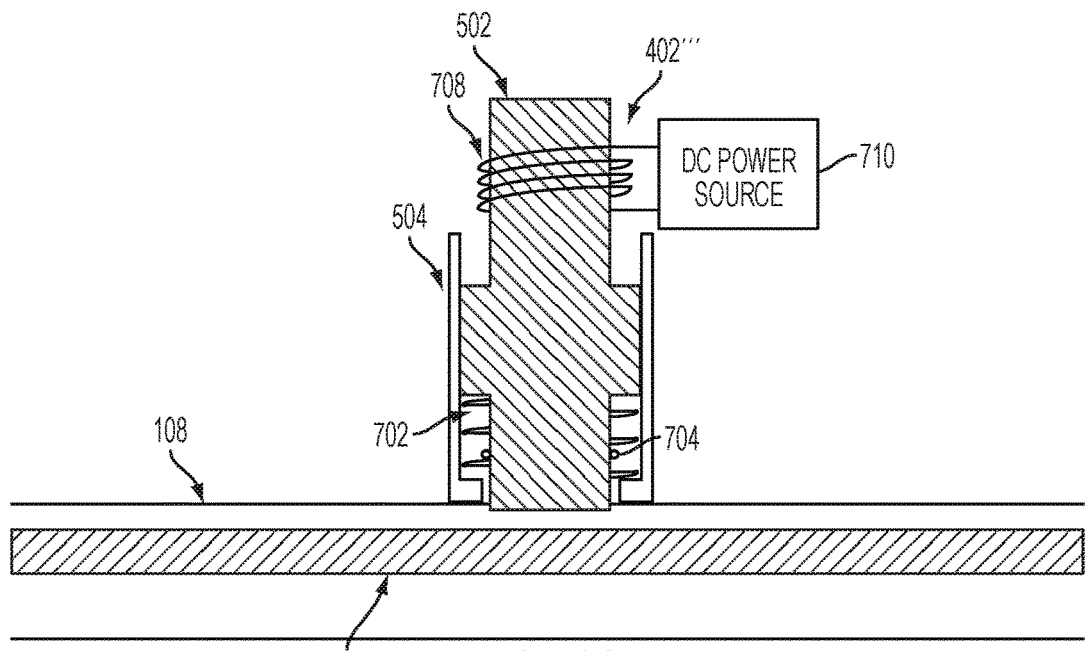
FIG. 12 is a cross-sectional side view of an electromagnetically actuated RF thermal fuse positioned along a transmission line according to one aspect.
Figure 13:
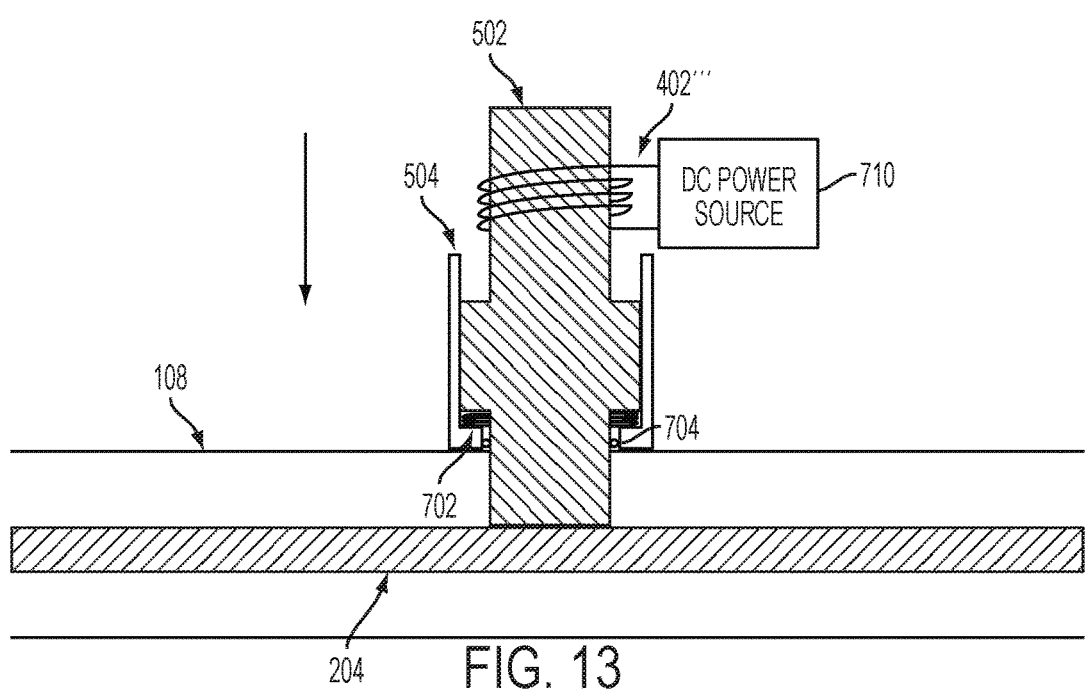
FIG. 13 is a cross-sectional side view of an electromagnetically actuated RF thermal fuse creating a short circuit in a transmission line according to one aspect.

In other aspects, a reversible RF thermal fuse 402 can be electromagnetically actuated to position the bolt 502. FIGS. 12-13 depict an RF thermal fuse 402''' that is electromagnetically actuated via an actuation coil 708 and a DC power source 710. A non-limiting example of a DC power source 710 is a power source of a protected RF device 106. In standard operation, as depicted in FIG. 12, the DC power source 710 can provide power creating an electromagnetic field through the actuation coil 708. The electromagnetic field through the actuation coil 708 can resist a force exerted by the spring 702. The DC power source 710 ceasing to provide power to the actuation coil 708 can reduce or eliminate the magnetic field resisting the force exerted by the spring 702. For example, the DC power source 710 may cease providing power in response to the protected RF device 106 being set to an "OFF" status. Ceasing resistance to the force exerted by the spring 702 can allow the spring 702 to contract. Contracting the spring 702 can cause the bolt 502 to move toward the conductor 204 of the transmission line 108, as depicted by the downward arrow in FIG. 13.

In additional or alternative aspects, a reversible RF thermal fuse 402 can include other driving mechanisms to position the bolt 502. For example, a driving mechanism can include a coil and an expansion spring for spring loading the bolt 502. The protected RF device 106 in an "ON" status can supply an electrical current to the coil, thereby causing the coil to exert an electro-magnetic force on the bolt. The electro-magnetic force on the bolt can move the bolt away from the protection point such that the bolt does not influence the transmission of RF signals along the protected transmission line 108. Moving the bolt away from the protection point can compress an expansion spring adjacent to the bolt 502 and adapted to exert a force against the bolt 502 in the direction of the conductor 204. The protected RF device 106 being set to an "OFF" status can cease the electrical current to the coil, thereby causing the current to cease exerting an electro-magnetic force on the bolt 502. The spring can expand in response to the cessation of the electro-magnetic force, thereby causing the bolt to contact the protected transmission line 108.

Figure 14:
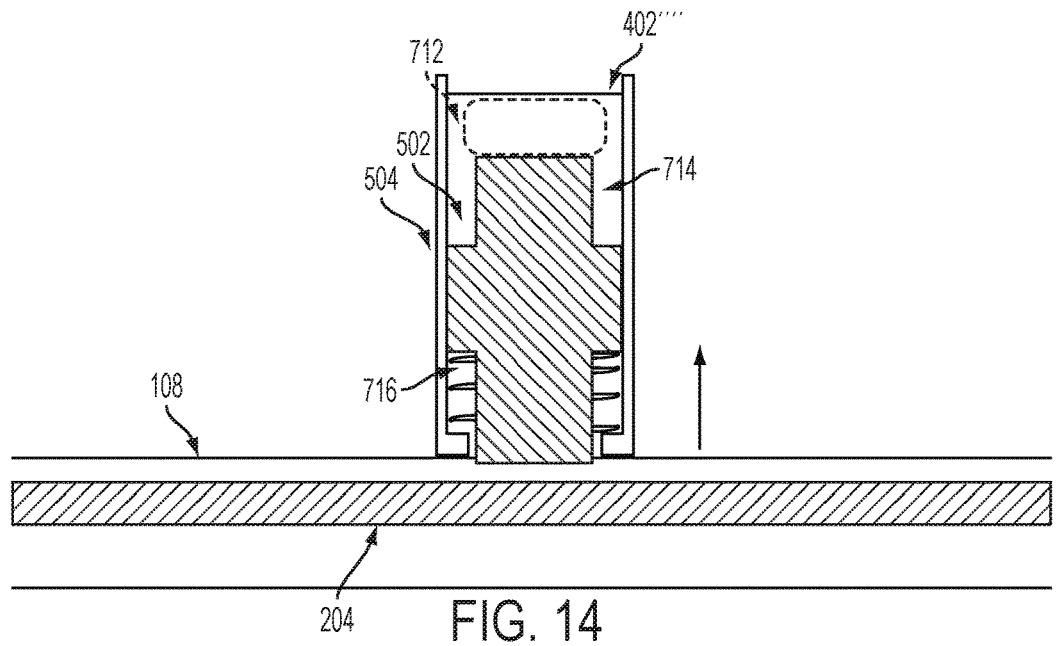
FIG. 14 is a cross-sectional side view of an RF thermal fuse actuated by an expandable gas that is positioned along a transmission line according to one aspect.
Figure 15:
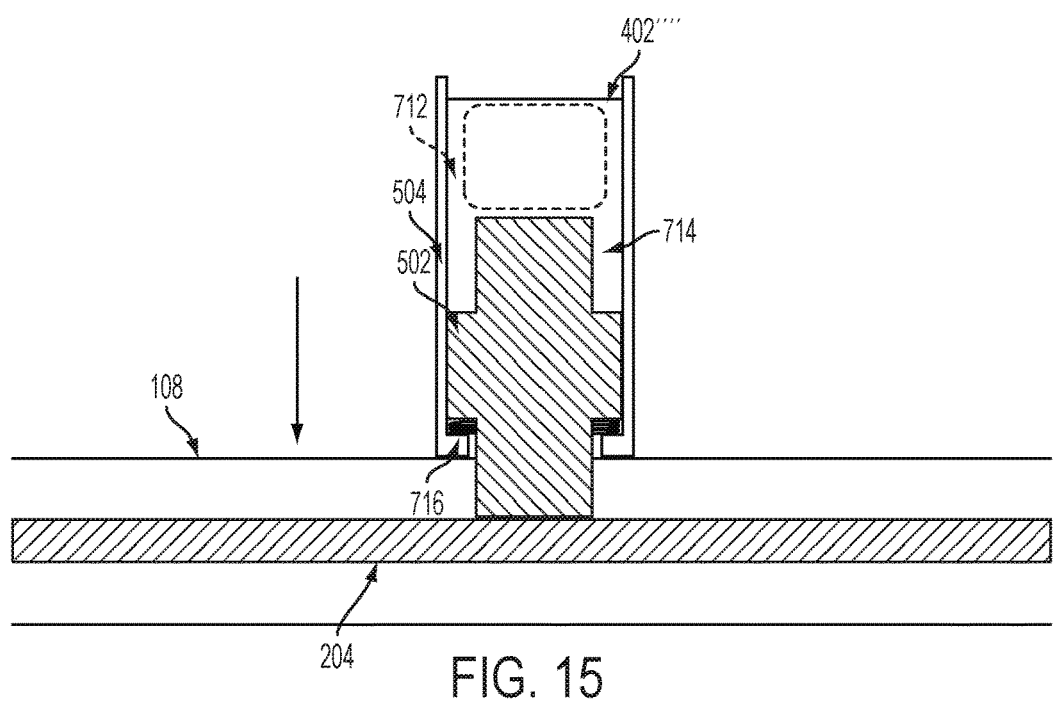
FIG. 15 is a cross-sectional side view of an RF thermal fuse actuated by an expandable gas creating a short circuit in a transmission line according to one aspect.

In other aspects, a reversible RF thermal fuse 402 can be actuated via an expandable gas to position the bolt 502. FIGS. 14-15 depict an RF thermal fuse 402"" that is actuated via an expandable gas 712 contained in a chamber 714. In standard operation, as depicted in FIG. 14, the gas 712 can have an amount of pressure that is sufficiently low that a force applied to the bolt 502 in response to the pressure of the gas 712 is less than a force exerted by a spring 716. The force can be exerted by a spring 716 against the bolt 502 in a direction away from the conductor 204, as depicted by the upward arrow in FIG. 14. The gas 712 can expand in response to a temperature at or near the RF thermal fuse 402"" exceeding a threshold temperature. The threshold temperature can be a temperature that is indicative of an overheating event. The expansion of the gas 712 can apply a sufficient pressure to the bolt 502 that the spring 716 is compressed and the bolt 502 is moved toward the conductor 204 of the transmission line 108, as depicted by the downward arrow in FIG. 15. A cessation or absence of the overheating event can allow the gas 712 to contract. The contraction of the gas 712 can reduce pressure applied to the bolt 502 such that that the spring 716 expands and the bolt 502 is moved away from the conductor 204 of the transmission line 108. The bolt 502 moving away from the conductor 204 of the transmission line 108 can return the bolt to the position depicted in FIG. 14. In additional or alternative aspects, the spring 716 can be omitted. The bolt 502 can be manually reset to the position depicted in FIG. 14 by a technician or other user.

Figure 16:
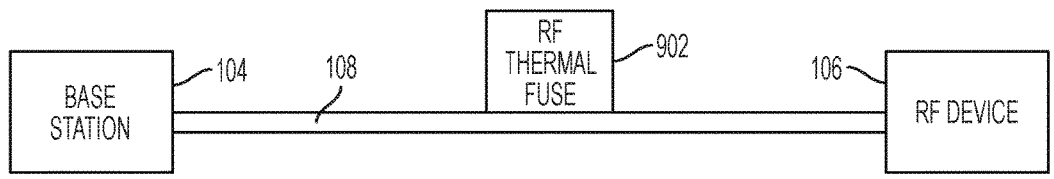
FIG. 16 is a block diagram of alternative example RF thermal fuse positioned along a transmission line between a base station and an RF device according to one aspect.
Figure 17:
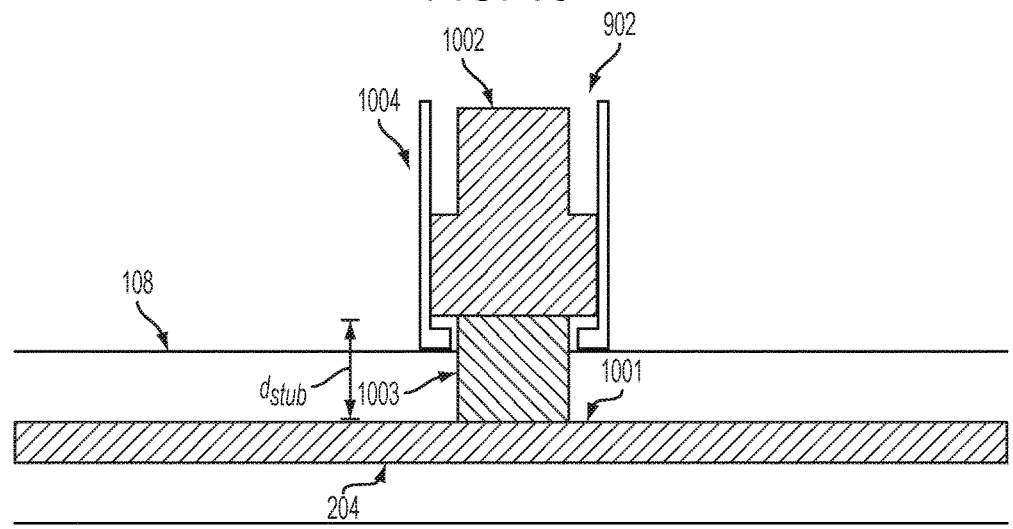
FIG. 17 is a cross-sectional side view of an RF thermal fuse for creating an open circuit positioned along a transmission line according to one aspect.
Figure 18:
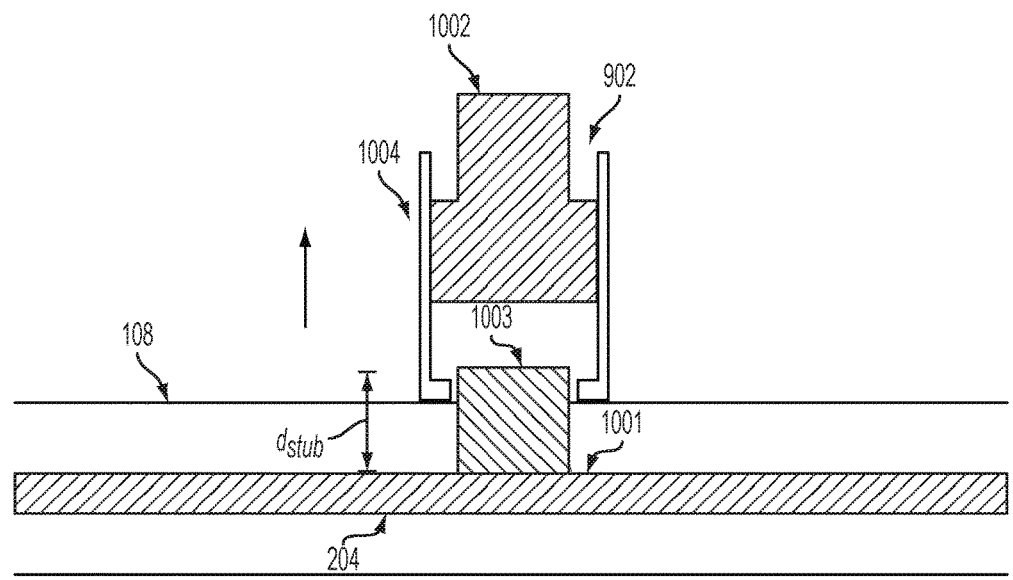
FIG. 18 is a cross-sectional side view of an RF thermal fuse creating an open circuit positioned along a transmission line according to one aspect.

For higher frequencies at which an impedance at the protection point can be too high, an RF thermal fuse having a λ/4 stub (d=λ/4) can be used, as depicted in FIGS. 16-18. FIG. 16 is a block diagram depicting an RF thermal fuse 902 positioned along a transmission line 108 between a base station 104 and an RF device 106. FIG. 17 is a cross-sectional side view of the RF thermal fuse 902 positioned along the transmission line 108 at a protection point 1001. The RF thermal fuse 902 can include a bolt 1002, a stub 1003, and a body 1004. The bolt 1002 and the stub 1003 can be disposed in the body 1004. The bolt 1002 and the stub 1003 can be formed from or otherwise include a conductive material, such as (but not limited to) copper. The bolt 1002 and the stub 1003 can be coupled or otherwise attached together via any suitable method providing an electrical path from the bolt 1002 through the stub 1003, such as (but not limited to) soldering the bolt 1002 to the stub 1003.

Standard operation of the protected RF device 106 can involve the RF thermal fuse 902 being short-circuited, as depicted in FIG. 17. A temperature at or near the protection point 1001 exceeding a threshold temperature can cause the RF thermal fuse 902 to provide an open circuit. The open circuit can be provided by the separation of the bolt 1002 and the stub 1003, as depicted by the upward arrow in FIG. 18. In some aspects, the RF thermal fuse 902 can be irreversible. For example, soldering the bolt 1002 to the stub 1003 can cause the RF thermal fuse 902 to be irreversible.

In some aspects, the stub 1003 can have a length of λ/4 stub. In other aspects, a longer stub 1003 (N≥2) can be used. A switching function of the RF thermal fuse can provide an open circuit at the protection point in standard operation. The switching function of the RF thermal fuse can provide a short circuit when protected. The bandwidth of operation can decrease as the value of N increases.

Figure 19:
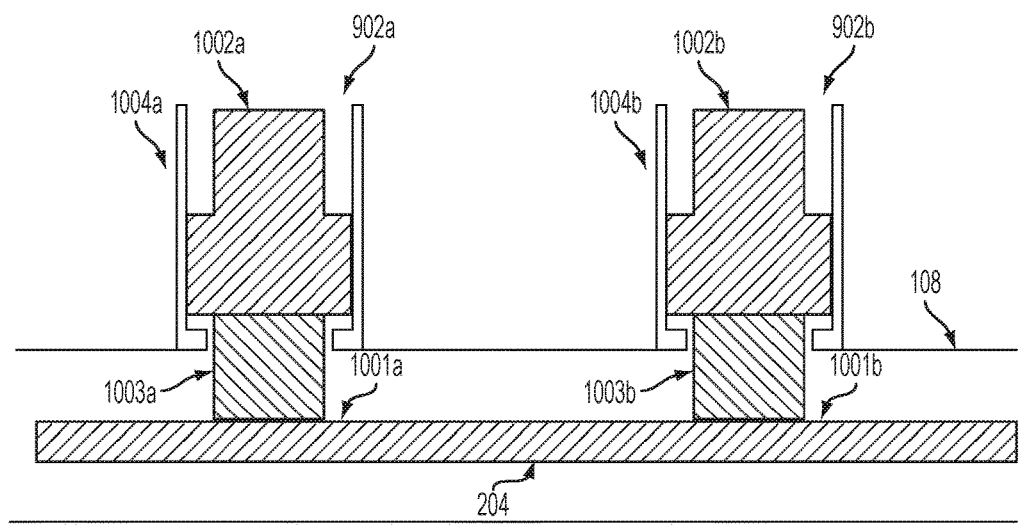
FIG. 19 is a cross-sectional side view of cascaded RF thermal fuses for creating open circuits positioned along a transmission line according to one aspect.

A wider operating frequency band of the RF thermal fuse may be required at higher RF frequencies of RF signals transmitted by the base station 104 or another RF signal source. A wider operating frequency band can be obtained by cascading more than one RF thermal fuse 902. For example, FIG. 19 is a cross-sectional side view of RF thermal fuses 902a, 902b at protection points 1001a, 1001b of a transmission line 108 during standard operation. The RF thermal fuses 902a, 902b respectively include bolts 1002a, 1002b and stubs 1003a, 1003b respectively disposed in bodies 1004a, 1004b.

Figure 20:
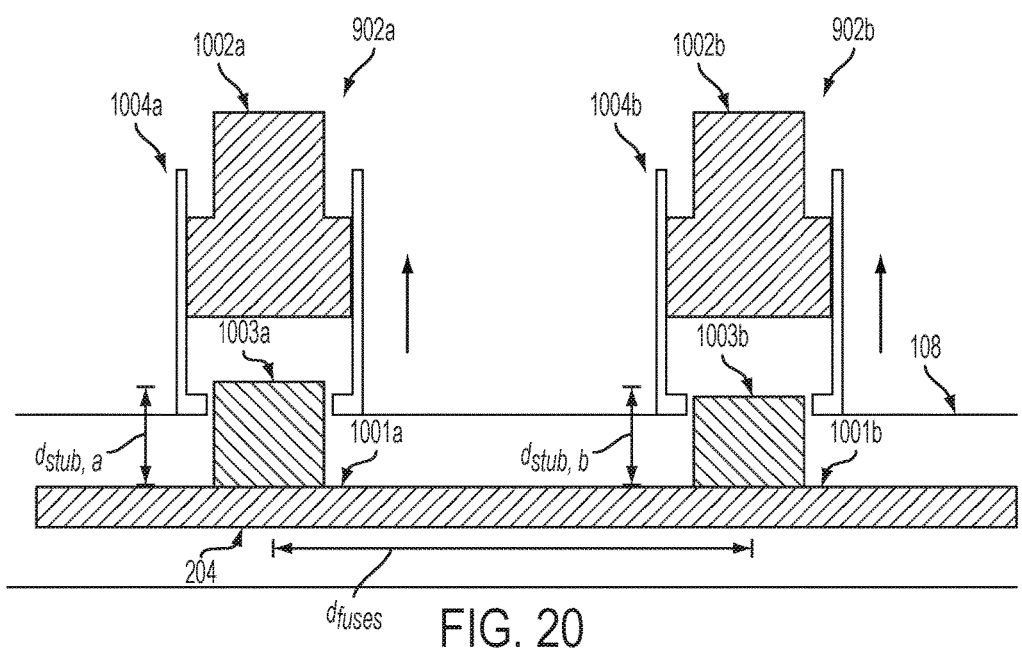
FIG. 20 is a cross-sectional side view of cascaded RF thermal fuses creating open circuits in a transmission line according to one aspect.

FIG. 20 is a cross-sectional side view of the RF thermal fuses 902a, 902b at protection points 1001a, 1001b creating open circuits in the transmission line 108. The open circuits in the transmission line 108 can be created by disconnecting the bolts 1002a, 1002b from the stubs 1003a, 1003b, as depicted by the upward arrows in FIG. 20. Each of the RF thermal fuses 902a, 902b can have a different length $d_{stub, i}$ of the respective one of the stubs 1003a, 1003b. For example, the thermal fuse 902a has the stub 1003a with a length $d_{stub, a}$ that is different from the length $d_{stub, b}$ of the stub 1003b for the thermal fuse 902b. The cascaded RF thermal fuses 902a, 902b can be positioned at a distance of $d_{fuses}$ from one another. Positioning the RF thermal fuses 902a, 902b at the distance of $d_{fuses}$ from one another can provide a wider, adjustable band of operating frequencies for protecting the RF device 106 receiving RF signals.

Figure 21:
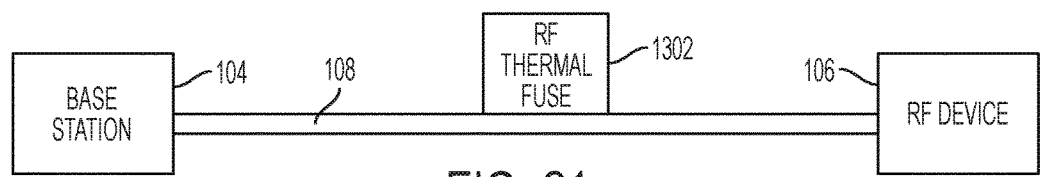
FIG. 21 is a block diagram of alternative example RF thermal fuse positioned along a transmission line between a base station and an RF device according to one aspect.
Figure 22:
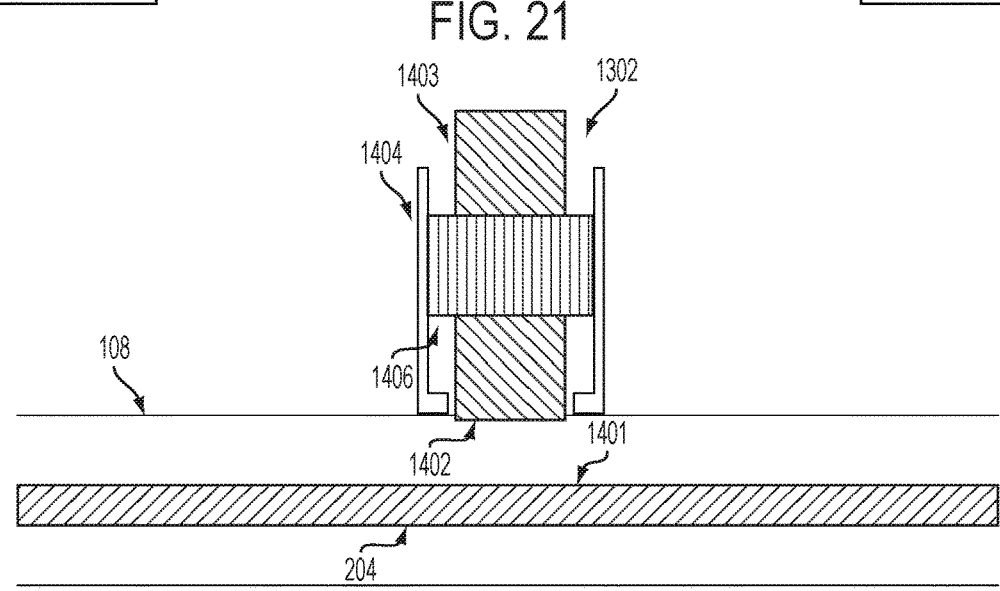
FIG. 22 is a cross-sectional side view of an RF thermal fuse having a dielectric material and positioned along a transmission line according to one aspect.
Figure 23:
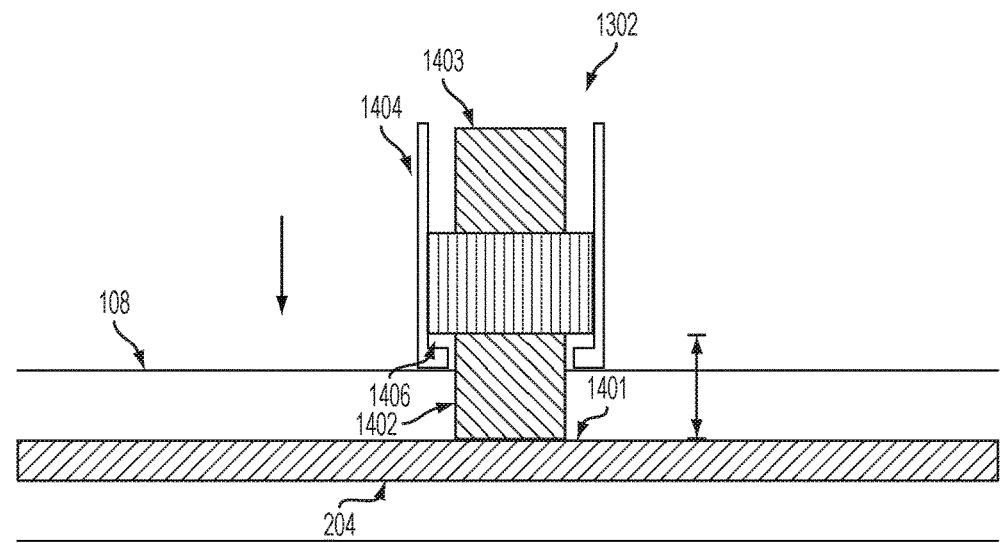
FIG. 23 is a cross-sectional side view of an RF thermal fuse having a dielectric material creating an open circuit in a transmission line according to one aspect.

Another non-limiting example of an RF thermal fuse having a reversible function at higher frequencies is depicted in FIGS. 21-23. FIG. 21 is a block diagram depicting an RF thermal fuse 1302 positioned along a transmission line 108 between a base station 104 and an RF device 106. FIG. 22 is a cross-sectional side view of a RF thermal fuse 1302 positioned along the transmission line 108 at a protection point 1401. The RF thermal fuse 1302 includes a bolt 1402, a bolt extender 1403, a body 1404, and a dielectric material 1406. The bolt 1402, the bolt extender 1403, and the dielectric material 1406 can be disposed in the body 1404. The dielectric material 1406 can be positioned between the bolt 1402 and the bolt extender 1403. For the protected RF device being in an "ON" status, bolt 1402, the bolt extender 1403 and the dielectric material 1406 can be positioned such that the transmission of RF signals from a base station 104 or other RF signal source to the protected RF device 106 is not affected. The bolt 1402, the bolt extender 1403 and the dielectric material 1406 can be shifted towards the conductor 204 in response to the temperature at the protection point 1401 exceeding a threshold temperature, as depicted by the downward arrow in FIG. 23. The bolt 1402 can contact the conductor 204. The bolt 1402 contacting the conductor 204 can cause a short circuit from the protection point 1401 to an open-circuit provided by the dielectric material 1406. The short circuit from the protection point 1401 to an open-circuit can have a length of λ/4 at the operating frequency of the transmitted RF signal.

Figure 24:
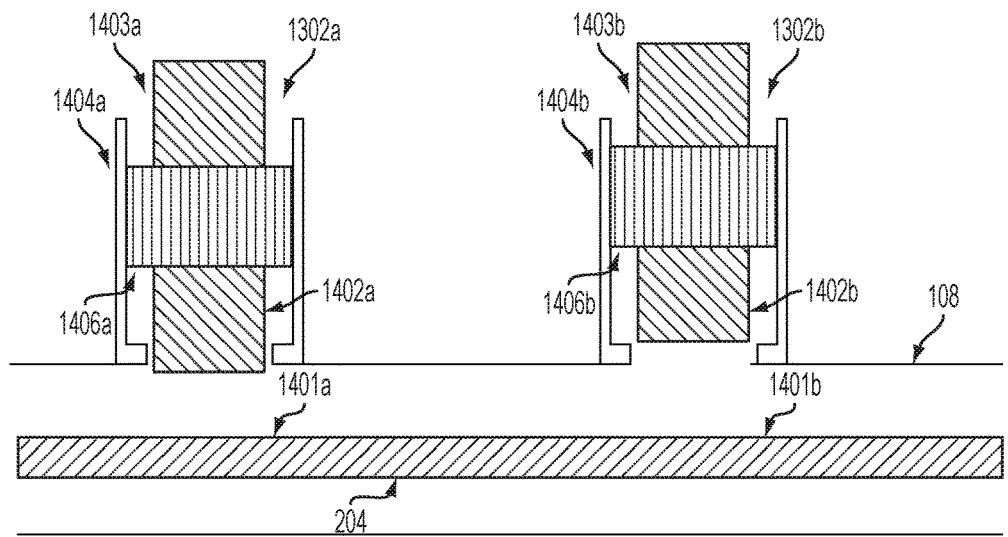
FIG. 24 is a cross-sectional side view of cascaded RF thermal fuses having dielectric materials and positioned along a transmission line according to one aspect.
Figure 25:
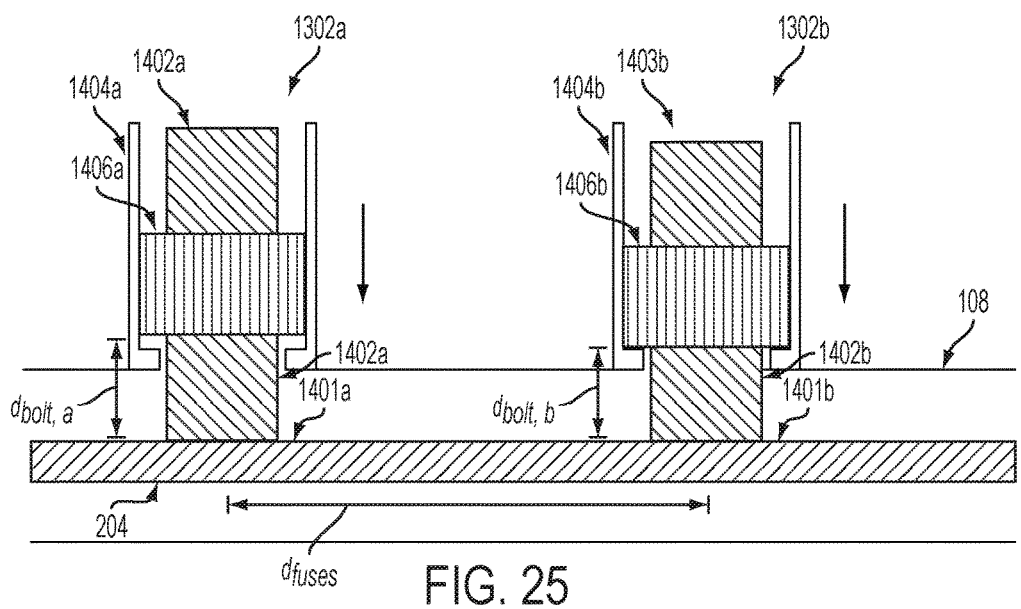
FIG. 25 is a cross-sectional side view of cascaded RF thermal fuses having dielectric material creating open circuits in a transmission line according to one aspect.

A wider operating frequency band of the RF thermal fuse may be required at higher RF frequencies. A wider operating frequency band can be obtained by cascading more than one RF thermal fuse 1302, as depicted in FIGS. 24-25. FIG. 24 is a cross-sectional side view of the RF thermal fuses 1302a, 1302b at protection points 1401a, 1401b during standard operation. The RF thermal fuses 1302a, 1302b respectively include bolts 1402a, 1402b, bolt extenders 1403a, 1403b, and dielectric materials 1406a, 1406b respectively disposed in bodies 1404a, 1404b. FIG. 25 is a cross-sectional side view of the RF thermal fuses 1302a, 1302b at protection points 1401a, 1401b creating short circuits in the transmission line 108. The short circuits in the transmission line 108 can be created by the bolts 1402a, 1402b contacting the conductor 204 of the transmission line 108, as depicted by the downward arrows in FIG. 25. Each of the RF thermal fuses 1302a, 1302b can have a different length $d_{bolt, i}$ for a respective bolt. As depicted in FIG. 25, the thermal fuse 1302a has the bolt 1402a with a length $d_{bolt, a}$ that is different from the length $d_{bolt, b}$ of the bolt 1402b for the thermal fuse 1302b. The cascaded RF thermal fuses 1302a, 1302b can be positioned at a distance of $d_{fuses}$ from one another. Positioning the RF thermal fuses 1302a, 1302b at the distance of $d_{fuses}$ from one another can provide a wider, adjustable operating frequency band for protecting the RF device 106 receiving RF signals.

In additional or alternative aspects, additional protection from overheating can be provided by a thermal over-temperature protection fuse for an RF termination device in a telecommunications system. A thermal over-temperature protection fuse can cause a signal path in a telecommunications system, such as an RF signal path, to open. Opening the signal path can interrupt electrical current, such as the current caused by a signal communicated from a base station or other telecommunications device, from flowing through the signal path. Interrupting the electrical current can prevent the base station 104 or other signal source from providing RF power to an RF termination device that includes the thermal over-temperature protection fuse.

Figure 26:
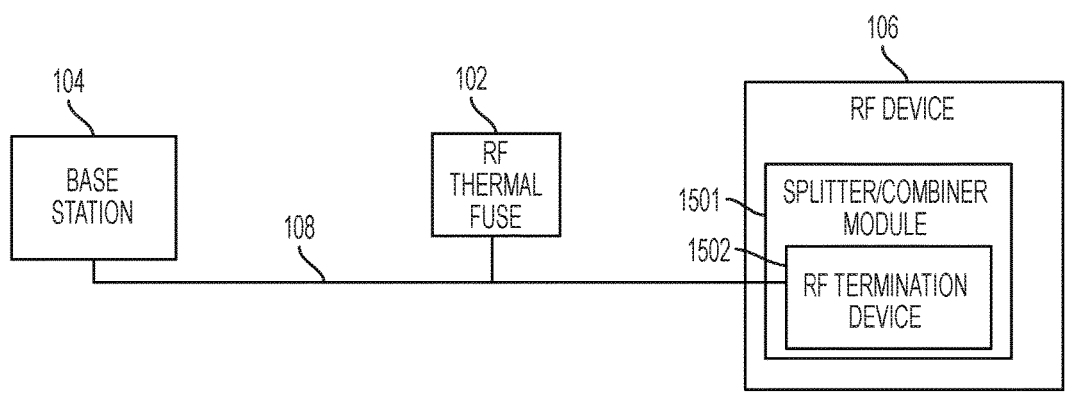
FIG. 26 is a block diagram of an RF device including an RF termination device and in communication with a base station via a transmission line according to one aspect.

For example, an RF termination device may be included in a protected RF device 106. FIG. 26 is a block diagram of the RF device 106 that includes an RF termination device 1502. A non-limiting example of an RF device 106 is a base station router or other a point-of-interface system or device. The RF device 106 can include a splitter/combiner module 1501 in which the RF termination device 1502 is disposed. The RF termination device 1502 can prevent the base station 104 and/or another RF signal source from providing RF power to the RF device 106. Preventing the base station 104 or other RF signal source from providing RF power to the RF termination device can prevent overheating of components of the protected RF device 106.

Figure 27:
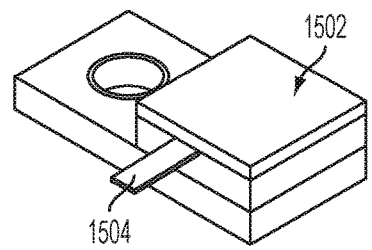
FIG. 27 is a perspective view of an RF termination device according to one aspect.

FIG. 27 is a perspective view of an example RF termination device 1502. An RF termination device 1502, such as the flange mount termination device depicted in FIG. 27, can include a lead 1504. An example of a flange mount termination device is a K100N50X4 half flange termination device. The RF termination device 1502 can receive power from a base station 104 or other telecommunications device, such as the RF device 106 via the lead 1504. The lead 1504 can be formed from any suitable conductive material, such as (but not limited to) copper or a copper alloy.

Figure 28:
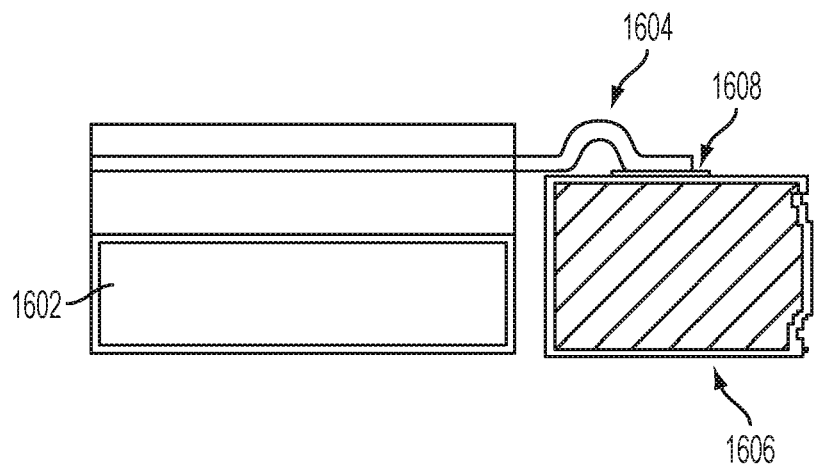
FIG. 28 is a cross-sectional side view of an RF termination device having a thermal over-temperature protection fuse according to one aspect.

FIG. 28 depicts an example of an RF termination device 1602 having a thermal over-temperature protection fuse 1604. The RF termination device 1602 can be coupled to a lead of a printed circuit board 1606 via the thermal over-temperature protection fuse 1604 or otherwise coupled to a component of a telecommunications device via the thermal over-temperature protection fuse 1604. The thermal over-temperature protection fuse 1604 can be coupled to a lead of the printed circuit board 1606 via a solder joint 1608.

The thermal over-temperature protection fuse 1604 can be coupled to a component of a telecommunications device such that a tension of the thermal over-temperature protection fuse 1604 exerts a force. The force exerted by the tension of the thermal over-temperature protection fuse 1604 can oppose a force exerted by the coupling of the thermal over-temperature protection fuse 1604 to the printed circuit board 1606. For example, as depicted in FIG. 28, the thermal over-temperature protection fuse 1604 can have a curved shape such that the thermal over-temperature protection fuse 1604 has a spring function. The thermal over-temperature protection fuse 1604 can be coupled to the printed circuit board 1606 via a solder joint 1608. The curved shape of the thermal over-temperature protection fuse 1604 can cause a force to be exerted that opposes the force of the solder joint 1608 coupling the thermal over-temperature protection fuse 1604 to the printed circuit board 1606.

Figure 29:
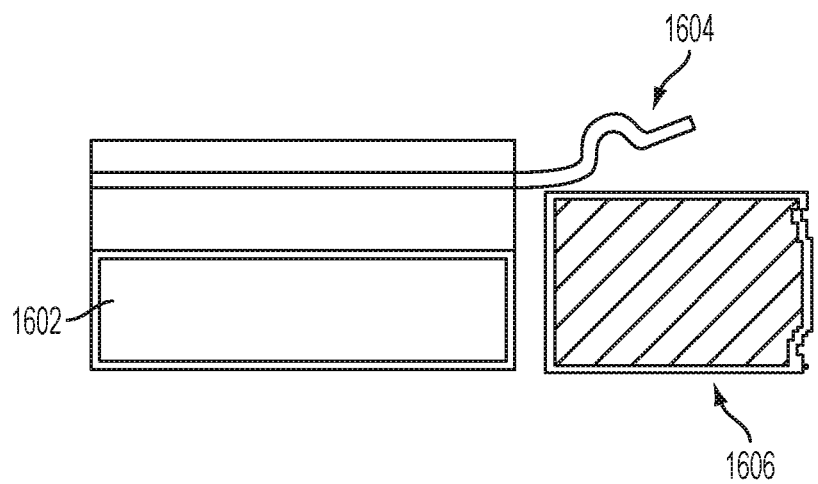
FIG. 29 is a cross-sectional side view of a thermal over-temperature protection fuse for an RF termination device creating an open circuit according to one aspect.

Ceasing the force exerted by the solder joint 1608 can cause the thermal over-temperature protection fuse 1604 to cease contacting the printed circuit board 1606, thereby opening the signal path terminated by the RF termination device 1602. Ceasing the forced exerted by the solder joint 1608 can be caused by, for example, the printed circuit board 1606 having a temperature sufficient to cause the solder joint 1608 to melt. For example, FIG. 29 depicts the RF termination device 1602 having a thermal over-temperature protection fuse 1604 that ceases contacting the printed circuit board 1606. The printed circuit board 1606 can have a sufficiently high temperature that the solder joint 1608 melts, thereby removing the force exerted by the solder joint 1608. The force caused by the shape of the thermal over-temperature protection fuse 1604 can cause the thermal over-temperature protection fuse 1604 to cease contacting the printed circuit board 1606, thereby opening the signal path in which the printed circuit board 1606 is disposed.

The base station 104 or other RF signal source can provide a signal to a signal path that is opened by the thermal over-temperature protection fuse 1604. The opening of the signal path by the thermal over-temperature protection fuse 1604 can cause the signal path to lack a termination mechanism. The un-terminated signal path can cause a signal provided by the base station 104 or other RF signal source to reflect back to the base station 104 or other RF signal source. The signal reflecting back to the base station 104 or other RF signal source can cause the base station 104 or other RF signal source to cease providing signals to the signal path that is opened by the thermal over-temperature protection fuse 1604. For example, a base station 104 receiving a reflected signal may be configured to terminate operation in response to receiving the reflected signal.

The thermal over-temperature protection fuse 1604 can be formed from a conductive material. The conductive material can have a strength sufficient that the thermal over-temperature protection fuse 1604 is not broken or otherwise damaged by the force opposing the force of the solder joint 1608. An example of such a conductive material can include, but is not limited to, beryllium copper. Other examples include copper alloys. Such copper alloys can include copper, which provides a conductive property, and one or more additional elements, which provide sufficient durability to prevent the thermal over-temperature protection fuse 1604 from being broken or otherwise damaged by the force opposing the force of the solder joint 1608.

Although the thermal over-temperature protection fuse 1604 is depicted in FIGS. 28 and 29 as having a curved shape, other implementations are possible. For example, the thermal over-temperature protection fuse 1604 can have a flat shape and be oriented at an angle away from the printed circuit board 1606 or other component of the telecommunications device. The thermal over-temperature protection fuse 1604 can be coupled to the printed circuit board 1606 or other component by exerting a force against the thermal over-temperature protection fuse 1604. The exerted force can cause the thermal over-temperature protection fuse 1604 to contact the printed circuit board 1606 or other component. The force can be exerted or otherwise caused by, for example, the solder joint 1608 retaining the thermal over-temperature protection fuse 1604 in a position contacting the printed circuit board 1606. The thermal over-temperature protection fuse 1604 can be formed from a material having a tension resisting the force exerted by the solder joint 1608. In the absence of the force exerted by the solder joint 1608, the thermal over-temperature protection fuse 1604 can return to an original orientation angle at which the thermal over-temperature protection fuse 1604 does not contact the printed circuit board 1606.

The solder joint 1608 can be formed from any conductive material having a sufficiently low melting point. For example, components of a telecommunications device may be capable of operating at temperatures up to 150 degrees Celsius. The performance of the components may be degraded or disrupted by temperatures in the range of 150 degrees Celsius to 250 degrees Celsius. A solder joint 1608 can be formed from a conductive material having a melting point in the range of 150 degrees Celsius to 250 degrees Celsius. A solder joint 1608 can be formed from a conductive material having a melting point exceeding 250 degrees Celsius. One example of a material from which the solder joint 1608 can be formed is Wood's metal. The solder joint 1608 can be soldered by hand or by machine.

In some aspects, the conductive material for the solder joint 1608 can have a melting point at a threshold temperature that is the same threshold temperature as the RF thermal fuse 102 positioned along the transmission line 108. In other aspects, the conductive material for the solder joint 1608 can have a melting point at a threshold temperature that is a different threshold temperature than the RF thermal fuse 102.

Figure 30:
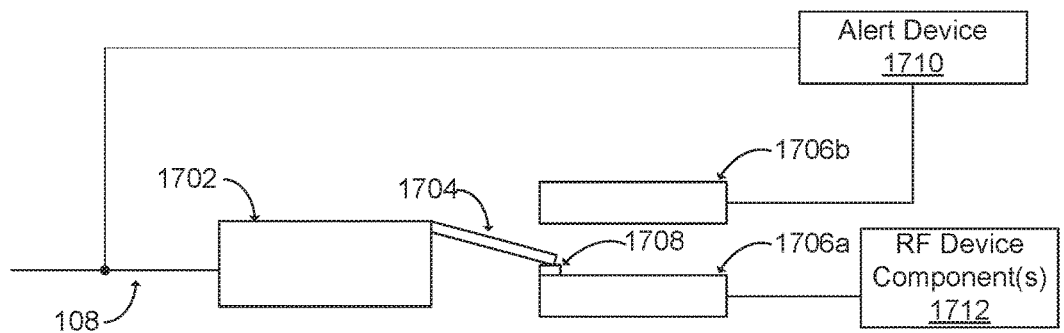
FIG. 30 is a cross-sectional side view of an RF termination device having a thermal over-temperature protection fuse configured to provide a single pole change over function according to one aspect.
Figure 31:
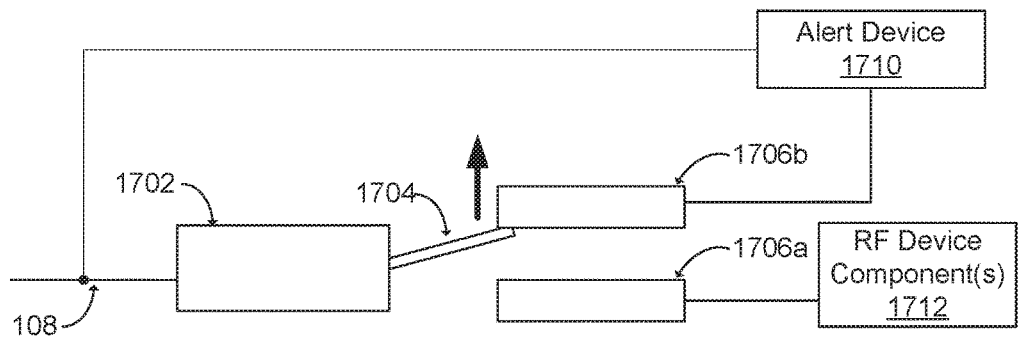
FIG. 31 is a cross-sectional side view of an RF termination device having a thermal over-temperature protection fuse configured to provide a single pole change over function according to one aspect.

In additional or alternative aspects, the thermal over-temperature protection fuse can be configured to provide a single pole changeover switching function. For example, as depicted in FIGS. 30-31, an RF termination device 1702 having a thermal over-temperature protection fuse 1704 can provide a single pole changeover switching function between leads 1706a, 1706b. The lead 1706a can be electrically connected to one or more RF device components 1712. The lead 1706b can be electrically connected to an alert device 1710. A non-limiting example of an alert device 1710 can include a transmitting device configured to transmit an alarm or other message in response to current flowing to the transmitting device or a signal being communicated to the transmitting device. In some aspects, the alert device 1710 can be coupled to the transmission line 108 and can communicate the alarm or other message via the transmission line 108, as depicted in FIG. 30. In other aspects, the alert device 1710 can include a wireless transmitting device configured to wirelessly broadcast or otherwise transmit the alarm or other message.

In normal operation, the thermal over-temperature protection fuse 1704 of the RF termination device 1702 can be coupled to the lead 1706a via a solder joint 1708. The shape of the thermal over-temperature protection fuse 1704 can cause a force to be exerted that opposes the force of a solder joint 1708 coupling the thermal over-temperature protection fuse 1704 to the lead 1706a. Current can flow and/or a signal can be communicated from the transmission line 108 to one or more RF device components 1712.

An overheating event can cause the lead 1706a to have a sufficiently high temperature that the solder joint 1708 melts. The lead 1706a having a temperature sufficient to cause the solder joint 1708 to melt can cause the forced exerted by the solder joint 1708 to cease. Ceasing the force exerted by the solder joint 1708 can cause the thermal over-temperature protection fuse 1704 to cease contacting the lead 1706a. The force caused by the shape of the thermal over-temperature protection fuse 1704 can cause the thermal over-temperature protection fuse 1704 to contact the lead 1706b, as depicted by the upward arrow in FIG. 31. The thermal over-temperature protection fuse 1704 contacting the lead 1706b can allow current to flow to the alert device 1710 and/or a signal from the transmission line 108 to be communicated to the alert device 1710. Current flowing to the alert device 1710 and/or a signal being communicated to the alert device 1710 can trigger an alert message from the alert device 1710 that an overheating condition has occurred. The alert from the alert device 1710 can identify the position of the RF termination device 1702 and identify that the thermal over-temperature protection fuse 1704 has switched from normal operation.

Although FIGS. 30-31 depict a single RF termination device 1702, a single thermal over-temperature protection fuse 1704, and a single alert device 1710, other implementations are possible. In additional or alternative aspects, multiple alert devices 1710 for multiple RF termination devices 1702 can be used to identify that multiple overheating events have occurred at multiple positions in an RF device 106 and/or in a telecommunication system having multiple RF devices 106.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. An RF thermal fuse comprising:
   a body;
   a conductive bolt positioned in the body, the conductive bolt having a length sufficient to provide an impedance at a point of protection on a transmission line in response to the conductive bolt contacting a live conductor of the transmission line, wherein the impedance reflects a portion of the incident power of an RF signal from an RF signal source; and
   a driving mechanism that causes the conductive bolt to selectively contact the live conductor in response to an event.

2. The RF thermal fuse of claim 1, wherein the driving mechanism causes the conductive bolt to move away from the live conductor in response to a second event.

3. The RF thermal fuse of claim 1, wherein the event comprises a protected RF device coupled to the transmission line being set to an off status.

4. The RF thermal fuse of claim 3, wherein the driving mechanism causes the conductive bolt to move away from the live conductor in response to the protected RF device being set to an on status.

5. The RF thermal fuse of claim 1, wherein the event comprises a change in an electrical signal received at the driving mechanism.

6. The RF thermal fuse of claim 1, wherein the event comprises a pressure from expansion of a gas.

7. The RF thermal fuse of claim 1, wherein the event comprises a sensor measurement passing a threshold.

8. A thermal protection system, the system comprising:
   a plurality of RF thermal fuses, each RF thermal fuse comprising:
   a body positioned on a transmission line between an RF signal source and an RF device;
   a conductive bolt positioned in the body, the conductive bolt having a length sufficient to provide an impedance at a point of protection on the transmission line in response to the conductive bolt contacting a live conductor of the transmission line; and
   a driving mechanism that causes the conductive bolt to selectively contact the live conductor in response to an event;
   wherein the plurality of RF thermal fuses are positioned on the transmission line at intervals such that the plurality of RF thermal fuses provide a combined impedance that reflects a portion of the incident power of an RF signal in a predetermined frequency band from the RF signal source.

9. The system of claim 8, wherein the driving mechanism causes the conductive bolt to move away from the live conductor in response to a second event.

10. The system of claim 8, wherein the event comprises the RF device being set to an off status.

11. The system of claim 10, wherein the driving mechanism causes the conductive bolt to move away from the live conductor in response to the RF device being set to an on status.

12. The system of claim 8, wherein the event comprises a change in an electrical signal received at the driving mechanism.

13. The system of claim 8, wherein the event comprises a pressure from expansion of a gas.

14. The system of claim 8, wherein the event comprises a sensor measurement passing a threshold.

15. An RF thermal fuse, the RF thermal fuse comprising:
a body positionable on a transmission line between an RF signal source and an RF device;
a conductive bolt positioned in the body having a length sufficient to provide an impedance that reflects a portion of a signal power of an RF signal from the RF signal source when the conductive bolt is in contact with a live conductor of the transmission line; and
a driving mechanism that causes the conductive bolt to selectively contact the live conductor in response to an event.

16. The RF thermal fuse of claim 15, wherein the driving mechanism causes the conductive bolt to move away from the live conductor in response to a second event.

17. The RF thermal fuse of claim 15, wherein the event comprises the RF device being set to an off status.

18. The RF thermal fuse of claim 17, wherein the driving mechanism causes the conductive bolt to move away from the live conductor in response to the RF device being set to an on status.

19. The RF thermal fuse of claim 15, wherein the event comprises a change in an electrical signal received at the driving mechanism.

20. The RF thermal fuse of claim 15, wherein the event comprises a pressure from expansion of a gas.

21. The RF thermal fuse of claim 15, wherein the event comprises a sensor measurement passing a threshold.

22. A system comprising:
an RF device in communication with an RF signal source via a transmission line;
an RF thermal fuse positioned on the transmission line, the RF thermal fuse comprising:
a body positioned on the transmission line between the RF signal source and the RF device;
a conductive bolt positioned in the body, the conductive bolt having a length sufficient to provide an impedance at a point of protection on the transmission line in response to the conductive bolt contacting a live conductor of the transmission line, wherein the impedance reflects a portion of the incident power of an RF signal from the RF signal source; and
a driving mechanism that causes the conductive bolt to selectively contact the live conductor in response to an event.

23. A thermal protection system comprising:
a plurality of RF thermal fuses, each RF thermal fuse comprising:
a body positioned on a transmission line between an RF signal source and an RF device;
a conductive bolt positioned in the body having a length sufficient to provide an impedance that reflects a portion of a signal power of an RF signal from the RF signal source when the conductive bolt is in contact with a live conductor of the transmission line; and
a driving mechanism that causes the conductive bolt to selectively contact a live conductor of the transmission line in response to an event;
wherein the plurality of RF thermal fuses are positioned on the transmission line at intervals such that the plurality of RF thermal fuses reflect the portions of the incident power of the RF signal in a predetermined frequency band from the RF signal source.

24. The thermal protection system of claim 23, wherein, for at least one of the plurality of RF thermal fuses, the driving mechanism is irreversible or reversible.

25. A system comprising:
an RF device in communication with an RF signal source via a transmission line;
an RF thermal fuse positioned on the transmission line, the RF thermal fuse comprising:
a body positioned on the transmission line between the RF signal source and the RF device;
a conductive bolt positioned in the body, the conductive bolt having a length sufficient to provide an impedance that reflects a portion of a signal power of an RF signal from the RF signal source when the conductive bolt is in contact with a live conductor of the transmission line; conductive bolt is in contact with a live conductor of the transmission line; and
a driving mechanism that causes the conductive bolt to selectively contact the live conductor in response to an event;
wherein the RF signal source reduces transmission power in response to the reflection of the portion of the signal power.

* * * * *